(12) United States Patent
Shen et al.

(10) Patent No.: US 7,672,492 B2
(45) Date of Patent: Mar. 2, 2010

(54) METHOD OF INCORPORATING PRIOR KNOWLEDGE IN LEVEL SET SEGMENTATION OF 3D COMPLEX STRUCTURES

(75) Inventors: Hong Shen, Plainsboro, NJ (US); Yonggang Shi, Los Angeles, CA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 917 days.

(21) Appl. No.: 11/334,276

(22) Filed: Jan. 18, 2006

(65) Prior Publication Data
US 2006/0171576 A1 Aug. 3, 2006

Related U.S. Application Data

(60) Provisional application No. 60/648,684, filed on Jan. 31, 2005.

(51) Int. Cl.
*G06K 9/00* (2006.01)
*G06K 9/40* (2006.01)

(52) U.S. Cl. .................. 382/128; 382/103; 382/254

(58) Field of Classification Search ......... 382/128–134, 382/103, 107, 164, 171, 173, 180, 181, 203, 382/206, 217, 218, 228, 284; 378/2, 4; 600/407, 600/436–437; 128/920, 922–925; 345/417, 345/420; 358/515, 520, 530
See application file for complete search history.

(56) References Cited

U.S. PATENT DOCUMENTS

| | | | | |
|---|---|---|---|---|
| 6,978,039 | B2 * | 12/2005 | Cline et al. | 382/128 |
| 7,095,890 | B2 * | 8/2006 | Paragios et al. | 382/173 |
| 7,424,153 | B2 * | 9/2008 | Paragios et al. | 382/173 |
| 2003/0086596 | A1 * | 5/2003 | Hipp et al. | 382/128 |
| 2004/0019267 | A1 * | 1/2004 | Paragios et al. | 600/407 |
| 2006/0171576 | A1 * | 8/2006 | Shen et al. | 382/128 |

* cited by examiner

*Primary Examiner*—Samir A. Ahmed
*Assistant Examiner*—Mehdi Rashidian
(74) *Attorney, Agent, or Firm*—Donald B. Paschburg (57) ABSTRACT

A process includes: generation of knowledge of the anatomical object to be separated from neighboring objects and identification of high level features (e.g., prior knowledge that includes: a mean shape template of the vertebra; and, high level features, e.g., readily identifiable boundary regions between the vertebrae neighboring objects, such as neighboring vertebra and rib structures); and the subsequent use of this prior knowledge to level set.

17 Claims, 11 Drawing Sheets

METHOD OF INCORPORATING PRIOR KNOWLEDGE IN LEVEL SET SEGMENTATION OF 3D COMPLEX STRUCTURES

CROSS-REFERENCED TO RELATED APPLICATIONS

This application claims priority from U.S. Provisional application Ser. No. 60/648,684, filed Jan. 31, 2005, which are incorporated herein by reference.

TECHNICAL FIELD

This invention relates generally to methods for anatomical object segmentation and more particularly to use of prior knowledge of the anatomical object to augment subsequent level set processing in such for anatomical object segmentation.

BACKGROUND AND SUMMARY

As is known in the art, many techniques used in the quantitative analysis of objects, such as anatomies and pathologies, from large three-dimensional (3D) volume of imaging data, such as CT data, includes the segmentation of the objects from neighboring objects. One challenge in segmentation comes from the inhomogeneity of the intensity distribution inside the object itself. This makes simple algorithms, like region growing, inapplicable. Edge-based methods also have trouble since there may be strong edges inside various parts of the objects, which becomes local minima. Another major challenge is leakage to neighboring objects. The leakage can be caused by weak edges, and sometimes there are no clear edges even for a human observer. Noise in the data makes this problem even harder since the weak edges will disappear if the data is smoothed to reduce the noise.

In the past decades, the development of level set methods received lots of attention in image segmentation. Many variations of the level set have been proposed, but they can be categorized into region-based and edge-based according to the type of image force or speed used. These methods start with an initial surface and update the surface iteratively towards object boundaries. The segmented surface is smooth due to curvature constraints. Much effort has been spend on the extraction of object surfaces from volume data using level set.

There are several important properties of the level set scheme. First, it automatically handles topological change, although this is of less or no benefit to the segmentation of complex 3D medical structures. Prior knowledge is crucial in the success of such segmentation, and the initial or model or shape should have at least the same topology as the object of interest. In fact, in the surface evolving process from a good initial surface, the algorithm needs to prevent the level set scheme from changing topology, which is an extra effort. The major advantage of the level set method is that it provides a scheme in which the surface can be implicitly represented in discrete volume functions, and can evolve in the format of partial differential equation (PDE) functions. The implementation is simple, and it is provides a flexible platform to design various algorithms. Further, the representation is transparent to dimension, which makes it much more desirable than some other methods that are hard to adapt to 3D cases.

Level set is a frame work in which the designing of speed functions and the detailed implementations leave much space for imagination. Early in the literature, local measures, such as intensity, edge, curvature, and texture have been used. This kind of implementations, however, is still in fact a low level processing method and the problem of local minima and leakage remain unchanged.

It is known that for the above challenges, low level processing alone is not enough and the incorporation of prior knowledge is necessary. In an article by Mitchell, S., C., Bosch, J., G., Lelieveldt, B. P. F., van de Geest, R., J., Reiber, J., H., C., and Sonka, M., entitled "3-D Active Appearance Models: Segmentation of Cardiac MR and Ultrasound Images" published in IEEE Transactions on Medical Imaging, 21(9), (2002), pp. 1167-78, a method based on the active shape model in 3D is proposed for the segmentation,. It is based on point representation of the shape described in an article by Cootes, T., F., Taylor, C., J., Cooper, D., H., and Granham, J., entitled "Active Shape Models—Their Training and Application", published in Computer Vision and Image Understanding, 61, (1995) pp. 38-59.

Shape is represented by a set of landmark points that are distributed on the object boundaries.

The level set methods provide a good framework to incorporate such prior knowledge since its unified representation of global and local shapes, and do not require point correspondence. Recently, there are works on how to use prior knowledge—particularly global shape priors to augment the level set methods. Among them, Leventon et al. in an article entitled "Statistical shape influence in geodesic active contours" published in Proceedings IEEE Conference on Computer Vision and Pattern Recognition, 1(1), 316-323, proposed a popular methods of Principle Component Analysis (PCA) model of signed distance functions. Simple results are reported for a selected number of different problems.

From our understanding, there are several intrinsic issues associated with the above PCA method when applied to the segmentation of 3D complex structures. The shape prior models use the linear PCA framework, even though the shape model by itself is inherently nonlinear. There has been discussion on why these linear methods work at all on nonlinear problems, as for example described in an article by Tsai, A., Yezzi, A., Wells, W., Tempany, C., Tucker, D., Fan, A, Grimson, W. E., & Willsky, A. (2003), entitled "A shape-based approach to the segmentation of medical imagery using level sets", published in IEEE Transactions on Medical Imaging, 22(2), 137-154.

It is believed that these methods restrict the search in the shape space to a neighborhood close to the mean shapes. Deviations far away from the mean will lead to strange shapes that are alien to the known object shapes.

The inventor has recognized that for complicated and at the same highly variant 3D shapes, there are several challenges. First, the complexity of the shapes requires many modes; Second, since the shapes are highly variant, large coefficients are needed to fully represent the shape variability, which will drive the algorithm out of the range the linear PCA method is valid. To keep the algorithm in the valid range, there is a preference to restrict the shape in the close neighborhood of the mean shape is restricted and the process relies on the level set method to evolve to the correct surface. This will reduce the power of the PCA method in preventing the local minima and leakage problems.

The first issue, on the other hand, makes training a challenging problem. To cover the complete spectrum of variations, large amount of training samples are needed to generate enough modes. This means the need to manually segment a large set of complex 3D shapes, which is an arduous task by itself. In the implementation level, since there could many combinations of possible modes, the search within the model space becomes an intractable optimization problem. Further, since segmented shape is strictly restricted to the mode space, it is almost impossible to handle shape variations due to pathologies in medical image data. For all of the reasons, using merely shaped based models would be hard to handle 3D segmentation problems effectively and efficiently.

On the other hand, a complex 3D structure usually has strong features. These are the few of high level features that are easily picked up and used as reference for recognition by a human observer. Some of these high level features form prominent and important image features with other structures in their neighborhood. These image features are in fact of global meaning. Whether they are successfully detected will lead to the success or failure of segmentation the complete structure. However, these high level shape features, especially contextual image features are so important that there be an explicit or parametric representation for them and direct the system to look for them, rather than embedding them implicitly in the general shape description.

The high level features differ from what has been used in previous works which use low level features such as local edges or corners found by general detectors. Many of the image features do not reflex the shape features; rather, they are local features within the object. That often provide disturbance rather than help to the segmentation. They are too numerous. The high level features are a few of the image features that belong to the object boundary. They are formed with the 3D context of the object, and need to be detected with prior knowledge. The successful detection of these features is key to the successful application of the level set methods.

Once these high level features are detected, a general method is used to incorporate them into the level set methods.

In accordance with the present invention, a process for anatomical object segmentation, comprises: generation of prior knowledge of the anatomical object to be separated from neighboring objects; and subsequently using of said prior knowledge to level set evolution.

In one embodiment, the prior knowledge includes obtaining a average shape template of the anatomical object.

In one embodiment the prior knowledge includes identifying high level features of the object, such high level features including identifiable interface regions between the object and neighboring objects.

In one embodiment, such high level features also includes identifiable boundary sections of the object surface;

In accordance with the invention, a process is provided for anatomical object segmentation, comprising: generation of prior knowledge of the anatomical object to be separated from neighboring objects; wherein the prior knowledge includes: obtaining an average shape template of the anatomical object and identifying high level features of the object, such high level features including at least one of identifiable interface regions between the object and neighboring objects or boundary sections on the object.

In one embodiment, the process includes subsequently using of said prior knowledge to level set evolution.

In one embodiment, the method includes dividing the template into a plurality of regions and wherein the level set evolution includes using a different image force for each one of the regions.

In one embodiment, the method includes selecting proper image force in each of the sub-region divisions.

In accordance with the present invention, a process includes: generation of knowledge of the anatomical object to be separated from neighboring objects and identification of high level features (i.e., prior knowledge that includes: a mean shape template of the vertebra; and, high level features, i.e., readily identifiable boundary regions between the vertebrae neighboring objects, such as neighboring vertebra and rib structures); and the subsequent use of this prior knowledge to level set.

Prior knowledge of an anatomical object is used for level set segmentation. The prior knowledge is represented with a general shape template and explicit representation of high-level features, such as interface regions between neighboring objects and the object of interest, i.e., the object being segmented from the neighboring objects. The process addresses the local minimum and leakage problem directly. The approach is a general principle that is particularly fit for the segmentation of 3D complex structures. For the sake of clarity, it is introduce in the context of vertebra segmentation from chest CT volume data.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
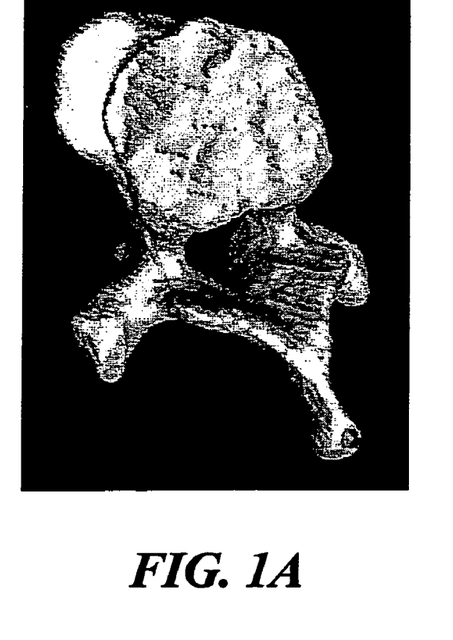
FIGS. 1A-1C are 3D views of a vertebra shape, such views being useful in understanding the invention.
Figure 1B:
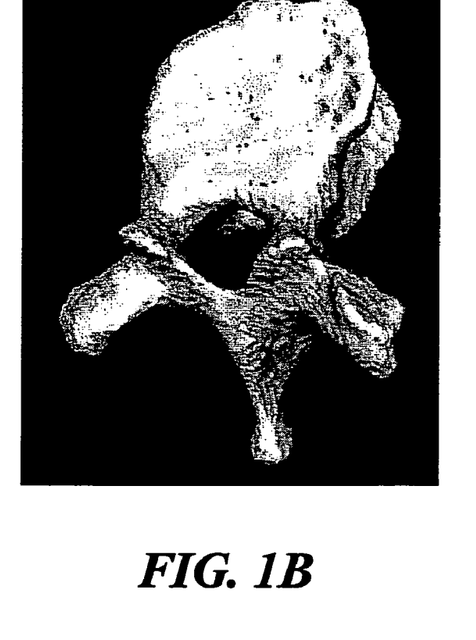
Figure 1C:
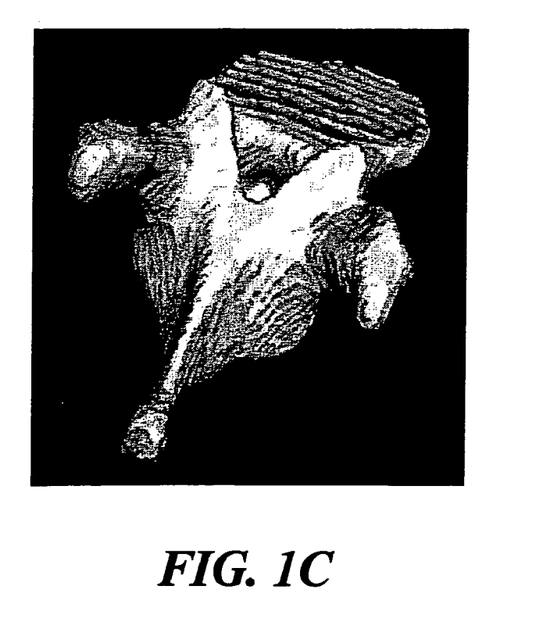
Figure 1D:
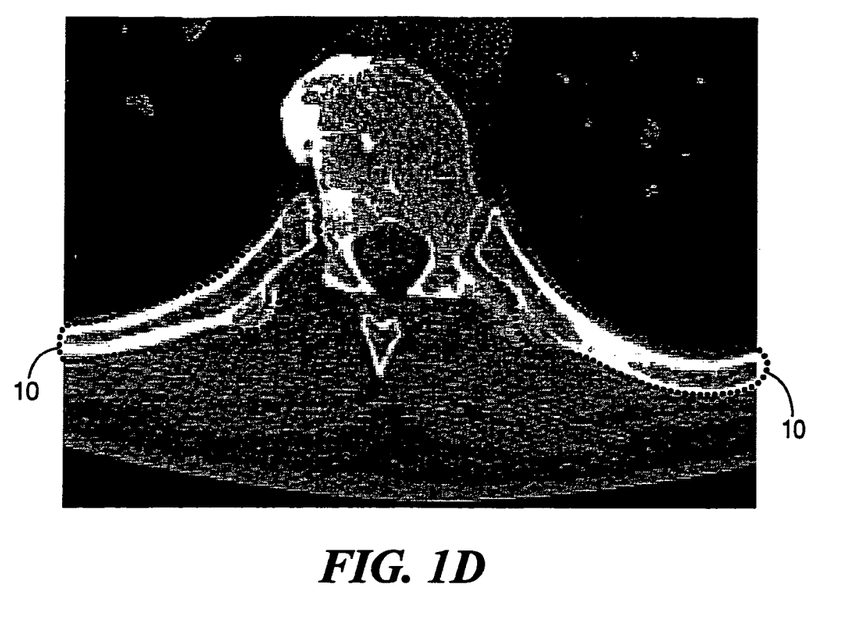
FIGS. 1D-1G are views of shapes of a vertebra on selected axial slices, with its neighboring vertebra and rib structures, the regions outlined by the dotted lines belonging to the neighboring vertebras and rib structures from which it is observed that the complex structure of vertebra and complex spatial relationship with its neighboring structures form complex 3D image features such views being useful in understanding the invention.

Referring now to FIGS. 1A-1C, a complex shape of a vertebra is shown in three-dimensional (3D) views. FIGS. 1D-1G show two-dimensional views of the vertebra on selected axial slices along with its neighboring vertebra and rib structures. The regions outlined by dotted line indicated by 10 belong to the neighboring vertebras and rib structures. From FIGS. 1D-1G it is noted that the complex structure of vertebra and complex spatial relationship with its neighboring structures form complex 3D image features. The processes described below will separate (i.e., segment) the vertebra from its neighboring vertebra and rib structures, Prior knowledge of an anatomical object is used for level set segmentation. The prior knowledge is represented with a general shape template and explicit representation of high-level features, such as interface regions between neighboring objects and the object of interest, i.e., the object being segmented from the neighboring objects. The process addresses the local minimum and leakage problem directly. The approach is a general principle that is particularly fit for the segmentation of 3D complex structures. For the sake of clarity, it is introduce in the context of vertebra segmentation from chest CT volume data.

Thus, in this example, the process begins by generating prior knowledge of the vertebra. This prior knowledge includes: a mean shape template of the vertebra; and, high level features and sub-region divisions. The high level features include high level context and boundary features. The high level context features are readily identifiable interface regions between the vertebrae neighboring objects, such as neighboring vertebra and rib structures. The high level boundary features are sections of the object boundaries. They can be modeled by simple parametric models, such as planes and parabolas.

Figure 2A:
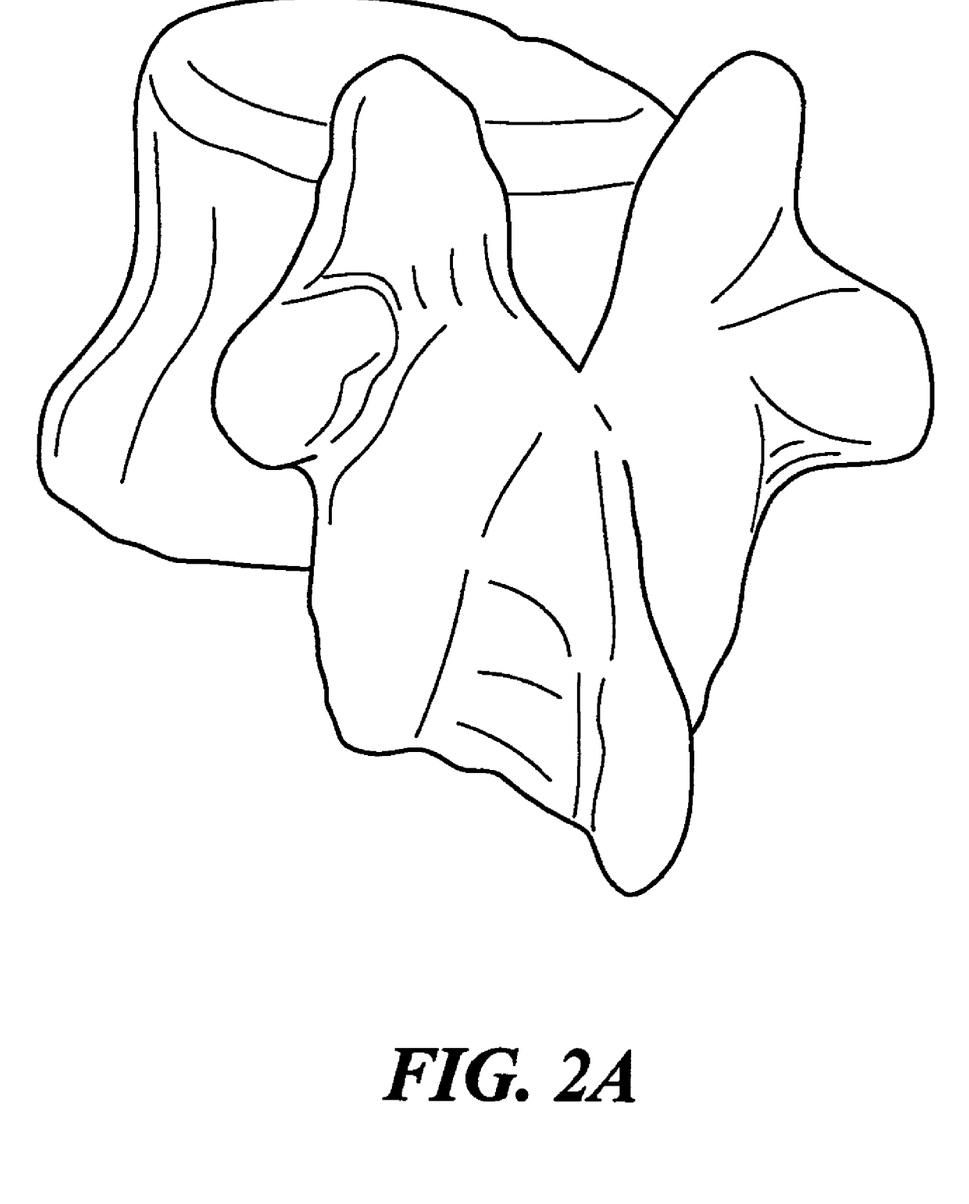
FIG. 2A is a mean shape template of an anatomical object obtained in accordance with the invention.
Figure 2B:
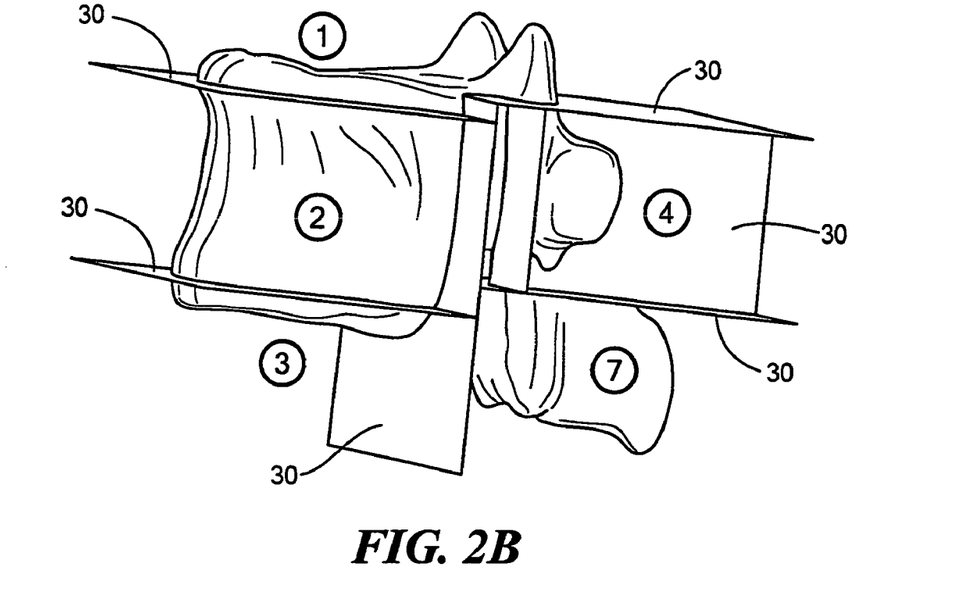
FIGS. 2B and 2C show a set of planes that divide the template of FIG. 2A into 3D regions, here 7 regions, wherein, for each region, an edge based or region based method is applied according to its image properties, in accordance with the invention.
Figure 2C:
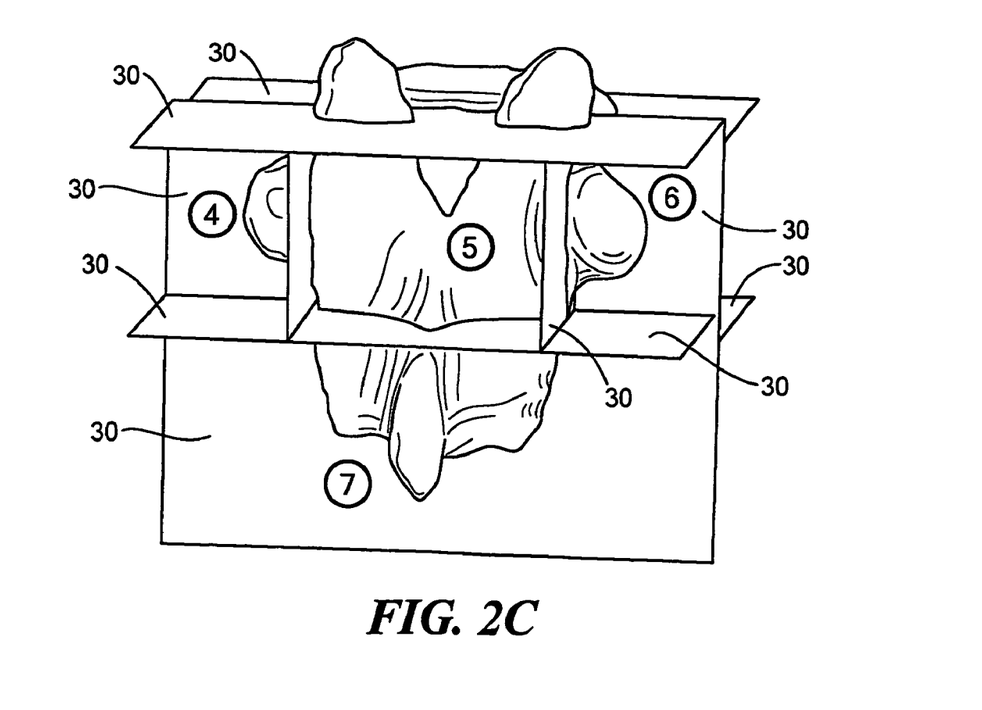

Referring to FIG. 2A, the average, or mean shape template of the vertebra is shown. FIGS. 2B and 2C show a set of planes 30 that divide the mean shape template into 3D regions. Here, in this example, there are seven regions in total, here designated as regions numbered 1-7, respectively. For each one of the 7 regions, an edge based or region based level set method is applied according to such region's image properties. For example one region may have relatively uniform intensities in the region, while another one of the regions may have relatively clear boundaries. These will lead to varied speed designs for each sub-region during a subsequent level set operation to be described.

The level set equation given by S. Osher, and J. A. Sethian, in an article entitled "Fronts Propagating with Curvature-Dependent Speed: Algorithms Based on Hamilton-Jacobi Formulations", Journal of Computational Physics, 79, pp. 12-49, 1988] as:

$$\phi_t + F|\nabla\phi| = 0, \text{ given } \phi(x, t=0).$$

F represents the speed in the normal direction is used. This is the initial value formulation. The problem of evolving front Γ(t) becomes solving the above equation. The speed term can be further represented in a general way as:

$$F = F_{prop} + F_{curv} + F_{adv}$$

where $F_{prop}$ is the propagation expansion speed, $F_{curv} = -\epsilon K$ is the curvature controlled speed and $F_{adv}$ is the advection speed.

Based on the type of propagation force, the level set forces or speed are classified into three groups: 1) the propagation force is constant. 2) The propagation force is determined by statistical means and 3) a set of seeds deform under the influence of image information; as described by J. S. Suri, S. Singh, S. Laxminarayan, X. Zeng, K. Liu and L. Reden, on an article entitled "Shape Recovery Algorithms Using Level Sets in 2-D/3-D Medical Imagery: A State-of-the-Art Review". Our algorithm is based on the first type of level set techniques and we chose the Chan-Vese model [T. F. Chan and L. A. Vese, "Active Contours without edges", IEEE transactions on Image Processing, 2001, 10(2): 266-277] because it is region-based and independent of edge information.

Figure 3A:
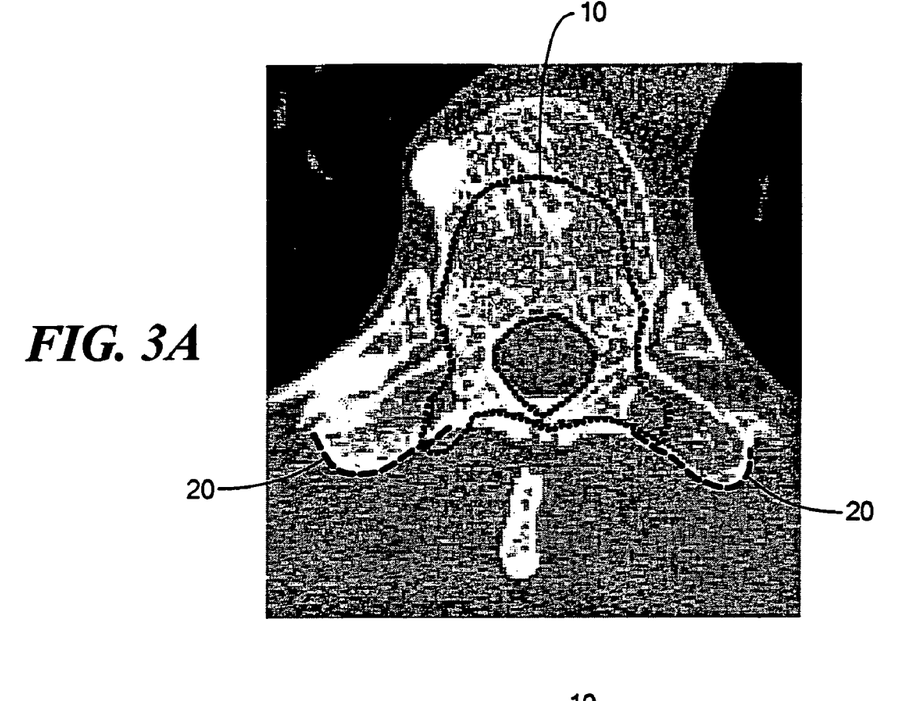
FIG. 3A is a 2D shape of a vertebra on one axial slice, the dotted region outlining the 2D shape of the mean shape template on this slice, this being the initial front for surface evolving in according with the invention, shown in the dashed region are the parts of the 2D contours of the 3D surfaces.
Figure 3B:
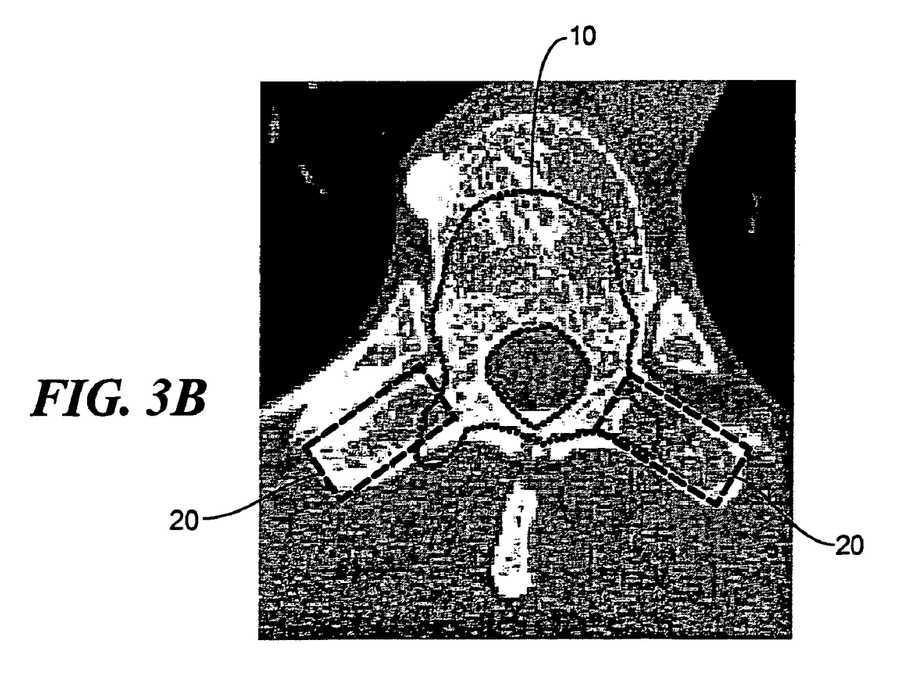
FIG. 3B shows the surface contours when the surface contours shown in dotted are detected, with the process according to the invention fitting a rectangular parallelepiped to the detected contours and adding it to the initial front.
Figure 3C:
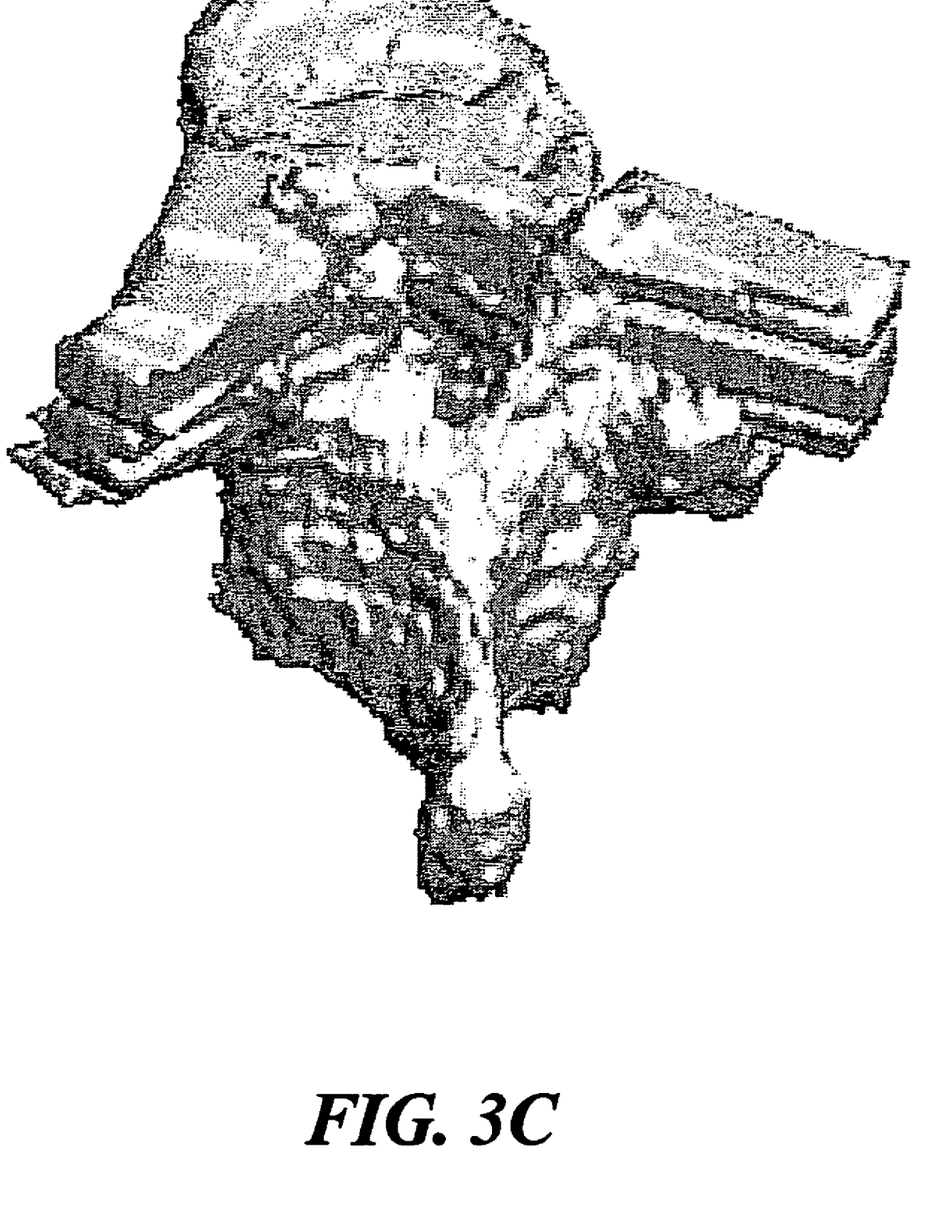
FIG. 3C showing 3D shape of the modified initial front in accordance with the invention.

Referring to FIG. 3A, a 2D shape of a vertebra on one axial slice is shown. Shown in dotted outline 10 is the 2D shape of the mean shape template on this slice, this is the initial front for surface evolving using the subsequent level set process. Shown in the dashed regions 20 are the parts of the 2D contours of the 3D surfaces. Referring to FIG. 3B, when the surface contours shown in the dashed regions 20 are detected, the process modifies the surface by fitting a rectangular parallelepiped to the detected contours and adding it to the initial front. FIG. 3C shows a 3D shape of the modified initial front.

Figure 4A:
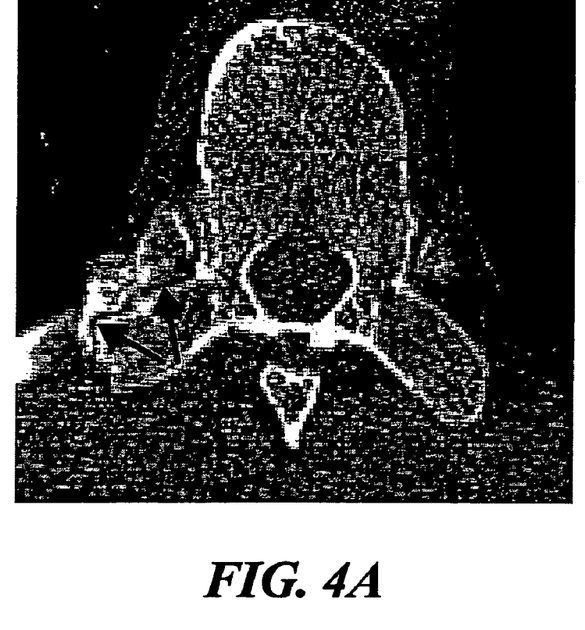
FIGS. 4A-4C shows some high-level features as marked by arrows, such features being strong features that are used the segmentation process according to the invention, such features serving as visual landmarks and, once detected, or marked, are used to form blocker regions to prevent leakage according to the invention.
Figure 4B:
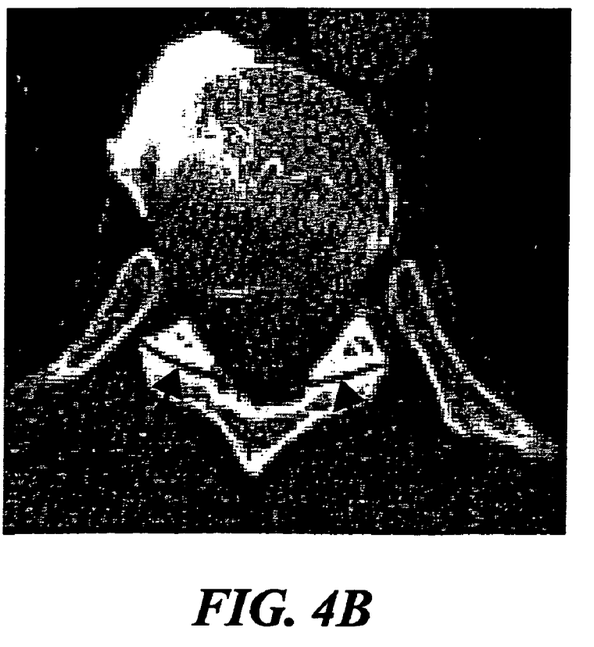
Figure 4C:
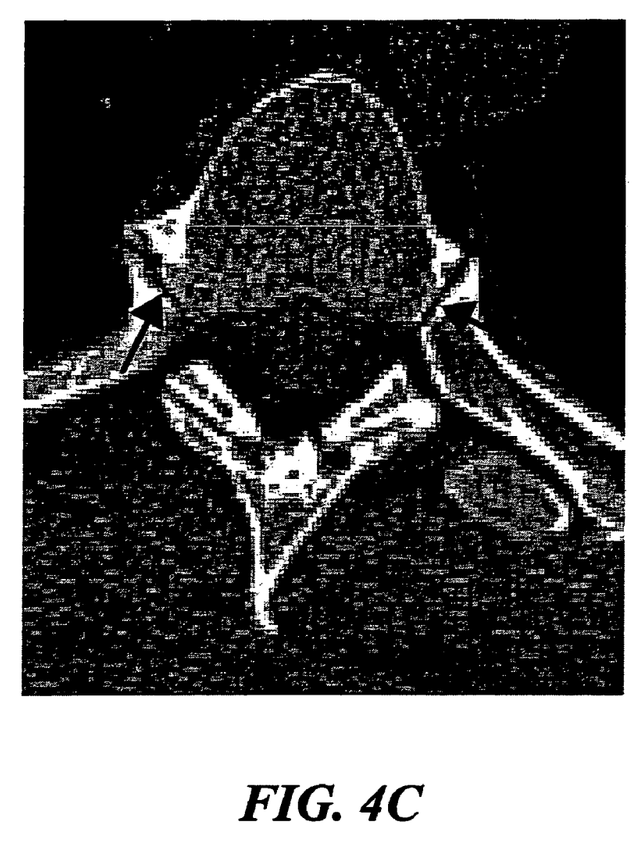

Referring to FIG. 4, some high-level boundary features are marked by arrows. These are the few strong features that are crucial in successful segmentation of the vertebra from its neighboring objects. They are also used by humans as visual landmark. Once detected or marked, they are used in blocker speed to prevent leakage during the subsequent level set process.

More particularly, the process includes: generation of knowledge of the anatomical object to be separated from neighboring objects and identification of high level features (i.e., prior knowledge that includes: a mean shape template of the vertebra; and, high level context and boundary features, i.e., readily identifiable boundary regions between the vertebrae neighboring objects, such as neighboring vertebra and rib structures; sections of the object boundaries and the subsequent use of this prior knowledge to level set evolution.

Representation of Prior Knowledge

The most important issue is how to effective represent prior knowledge in order to use it seamlessly in the level set framework. In our approach, prior knowledge is represented by (1) a mean shape (2) a set of high-level features.

The mean shape, as shown in FIG. 2A, is the average shape of a selection of vertebras representing the rough spectrum of shape variations within the normal range. It has the basic look and structures that belong to and characterize a vertebra, such as the center spinal cord, the transverse processes, the superior articular process, etc. Certainly, the mean shape will not cover the shape variations. It should be understood that there is any intention to have a representation that covers the large variations. Obviously, the mean shape is used as a rough guide or template, as will be describe later. This low requirement allows a small sample size, corresponding to a much smaller manual training task.

The prior knowledge is also represented with a set of high level features. Some of the most distinctive features and the relatively easily detected features are first extracted in order to estimate pose, which will determine the alignment of the vertebra and the mean shape template. These include the spinal cord and some points on the two flat surfaces that are facing the surfaces of the adjacent vertebras. Here, in this example, it is assumes these high level features are extracted and will describe their detection in future application based inventions.

The mean shape template will also guide the algorithm to search for other high level context and boundary features. The high level context features are formed by the contact of surfaces between the vertebra and its neighboring structures, such as the planar ridges for the superior articular processes and the ridges between the ribs and the vertebra. The high level context features differ from local features in that they are significant and can be fitted with simple parametric models, such as planes, parabolas or other simple geometric shapes The template, once aligned with the object, will give regions of interest in which to search the known high-level features. It will also provide shape and orientation information to filter the false detections.

The above knowledge representation of the prior knowledge will play a key role in surface evolving. It is uses it in three different ways to tackle the common difficulties associated with the level set method.

Application of Prior Knowledge Representation in Level Set Framework

The above knowledge representation of the prior knowledge will play a key role in surface evolving. Here, it is used in three different ways to tackle the common difficulties associated with the level set method: (1) Template guided region division and combination of edge and region based methods; (2) Use of high-level features in initial front design; and (3) Use of high-level features as blockers Template Guided Region Division and Combination of Edge and Region Based Methods Active contour based segmentation algorithms extracts region boundaries by optimizing some criteria. They can be classified as region-based and edge-based methods. The region-based methods look for regions with homogeneous intensities or textures. Edge-based methods are rather local and they seek to localize places with high edge responses. For low level processing, one of them is usually chosen according to the image characteristics. In many situations, neither of the methods by itself is sufficient. For instance, edges are prevalent inside the vertebra, and the intensities or textures are neither uniform inside the vertebra. How to adaptively combine region-based or edge-based methods to handle regions with different properties is still an open problem.

Here, a top-down approach for the combination of region-based and edge-based methods. Given a prior shape of the object and its intensity characteristics, the process divides the object into a set of regions. For each region, the process chooses the best active contour model. The regions in the template are separated by a set of planes that are associated with anatomies of the object, as shown in FIGS. 2B and 2C. Region 1, 2, and 3 correspond to the main body of a vertebra and the superior articular processes, and the process would use a region-based level set method. For each of the three regions, parameters are tuned to its special intensity characteristics. Region 4 and 6 are the transverse processes of a vertebra and they usually have lower intensity than other parts, thus edge-based active surface models are for them. Region 5 includes the root of the vertebra arch, and the lamina part. For this part, both the region-based and edge-based level set model. Region 7 is the spinous process and a region-based level set process model is used since it usually has higher intensity than its surrounding tissue.

These division planes are part of the template. After the template alignment, the local region of interest is divided into regions by the mapped planes, and corresponding selected active contour model is used in each region.

Use of High-Level Features in Initial Front Design

Figure 1E:
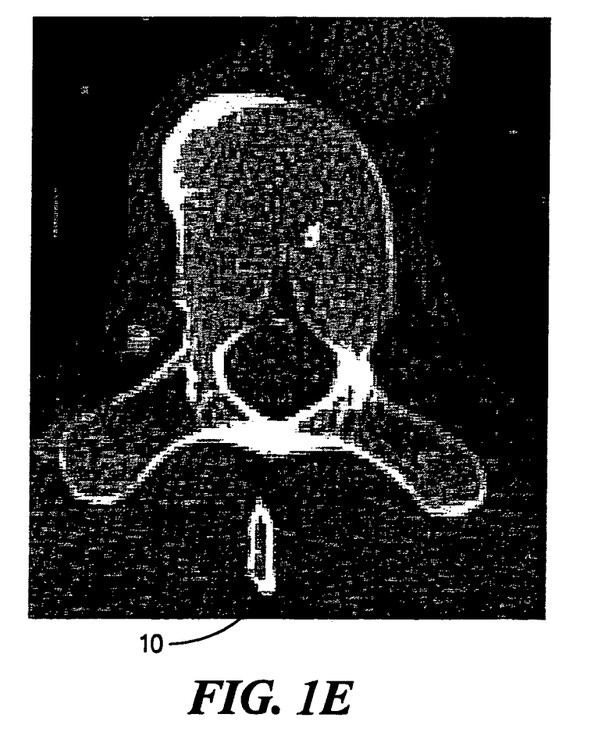
Figure 1F:
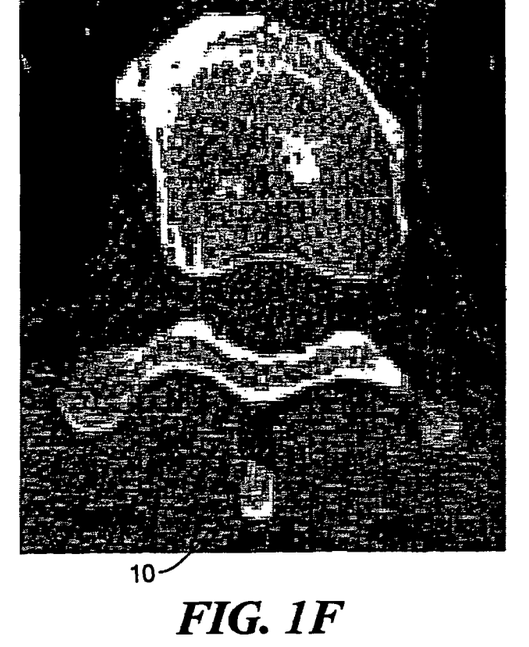
Figure 1G:
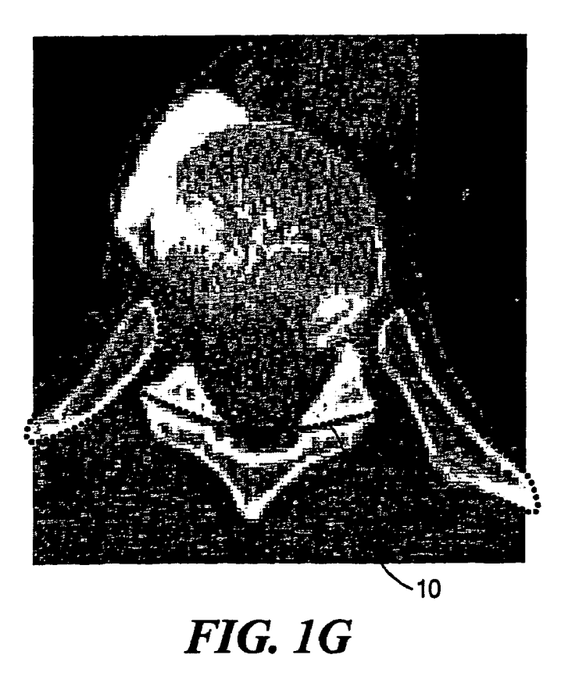

As shown in FIG. 1E and FIG. 3A, a 3D complex structure such as vertebra has numerous internal edges. Edge-based active surface models are well known to be sensitive to such local minima. To avoid the problem of local minima, a region-based active surface is desirable. When an edge based surface is necessary, the behavior and result of surface evolving will heavily depend on the initial front. A good initial front will not only help converging the front to the correct surface, but also will greatly reduce the time of convergence.

High-level features are used in the design of an initial front for the level set. As an example, suppose in the vertebra segmentation, the process used the aligned mean shape template as the initial front for the level set process. The 2D shape of the vertebra and the aligned template is shown in FIG. 3A. Since there are the many strong edges in the two transverse processes, such an initial front will for sure converge at local minima. On the other hand, outlined in the dashed regions 20 are the true surfaces that map to strong edges in the image. If the initial front is set to their close neighborhoods, the front will converge to them. With this in mind, suppose all or some of these edges are detected; then any arbitrary shape can be fit, for instance a rectangular parallelepiped can be fit to these edges. The process then merges this with the original template front, as shown in FIGS. 3B and 3C. The front will then converge to the strong and close by edges.

This method of incorporating high-level features into the level set framework has several added benefits. First, it is easy to implement. Second, it adds to the robustness of the system. The detected edges do not have to be complete or perfect. The incomplete or imperfection will be handled by the smooth constraints of the level set method. Finally, it also offers a way to incorporate user interaction. The user can draw part of the boundaries in a couple of slices—the more the better—and the initial front will be modified. In this way, a minor interaction can greatly change the convergence of the algorithm and also improve the convergence speed. This is what is desired for user interaction—minor action with maximum benefits.

Use of High-Level Features as Blockers

High-level features are critical in preventing leakage. The combination of parametric features with non-parametric level set methods is rare in the literature. Mostly something non-parametric like an edge map is used to attract the surface towards object boundaries. Here the process uses the high level features as boundary blockers rather than attractors. One difference between a blocker and an attractor is that the former is not active until a surface hits it while the latter is always active. Another difference is that the blocker assumes certain direction from which the surface will arrive, while the attractor is omni-directional and it will attract surface coming from all directions. Thus a different speed design strategy needs to be developed.

The high-level features are crucial when the local gradient forces can not prevent the surface from evolving outside of the region to be segmented. High-level features include ridges between the region and its neighboring structures, strong anatomic corners, etc. Just as we compute gradient maps to use in the edge-based speed, we could also computer ridge map and corner maps to combine with the edge-based speed. However, just like the edges, these other low-level features are everywhere, causing more problems of local minima. One the other hand, the high-level features are much sparser than the edges, and they are stronger, and contain more important prior information. Therefore, processing power should be concentrated on the possible areas to specifically look for these features, rather than computing a general ridge, corner, or other low-level feature maps. Once detected, or marked by the user, we are very sure about its reliability. These high-level features will be used as explicit blockers so that the evolving front can never pass them. In this way, the high-level features play a more direct and specific role.

To design speed for blockers, a reference system is necessary to specify the direction from which the surface will arrive. In this work, we use the mapped template as the reference. The template provides help for the usage of these features. It gives direction of inside and outside. Given a blocker feature, the speeds of the voxels that are on the outside direction are set to −1. In this way, the front will never pass these features.

It should be understood that the mean shape template plays a key role in the segmentation. The correct alignment of the template with the data is therefore crucial. A complex medical structure will often have distinct high-level features that are easy to detect. For instance, the vertebra has the round-shape spinal cord that can be fairly easily detected and segmented. This 3D shape, combined with several other points, is sufficient to estimate the pose.

The pose is estimated as a similarity transformation. The mean shape template is then mapped to the image domain. The ridge features are then detected in a region of interest around the known ridge points that mapped to the image data.

Thus, as described above, the process uses prior knowledge to a level set framework in anatomical object segmentation. This approach is useful in the segmentation of 3D complex structures with strong prior knowledge.

Figure 5:
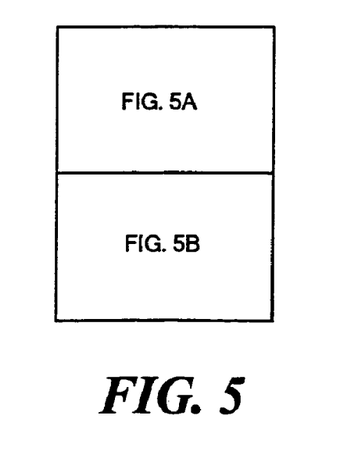
FIG. 5 is a flow diagrams the segmentation process according to the invention.
Figure 5A:
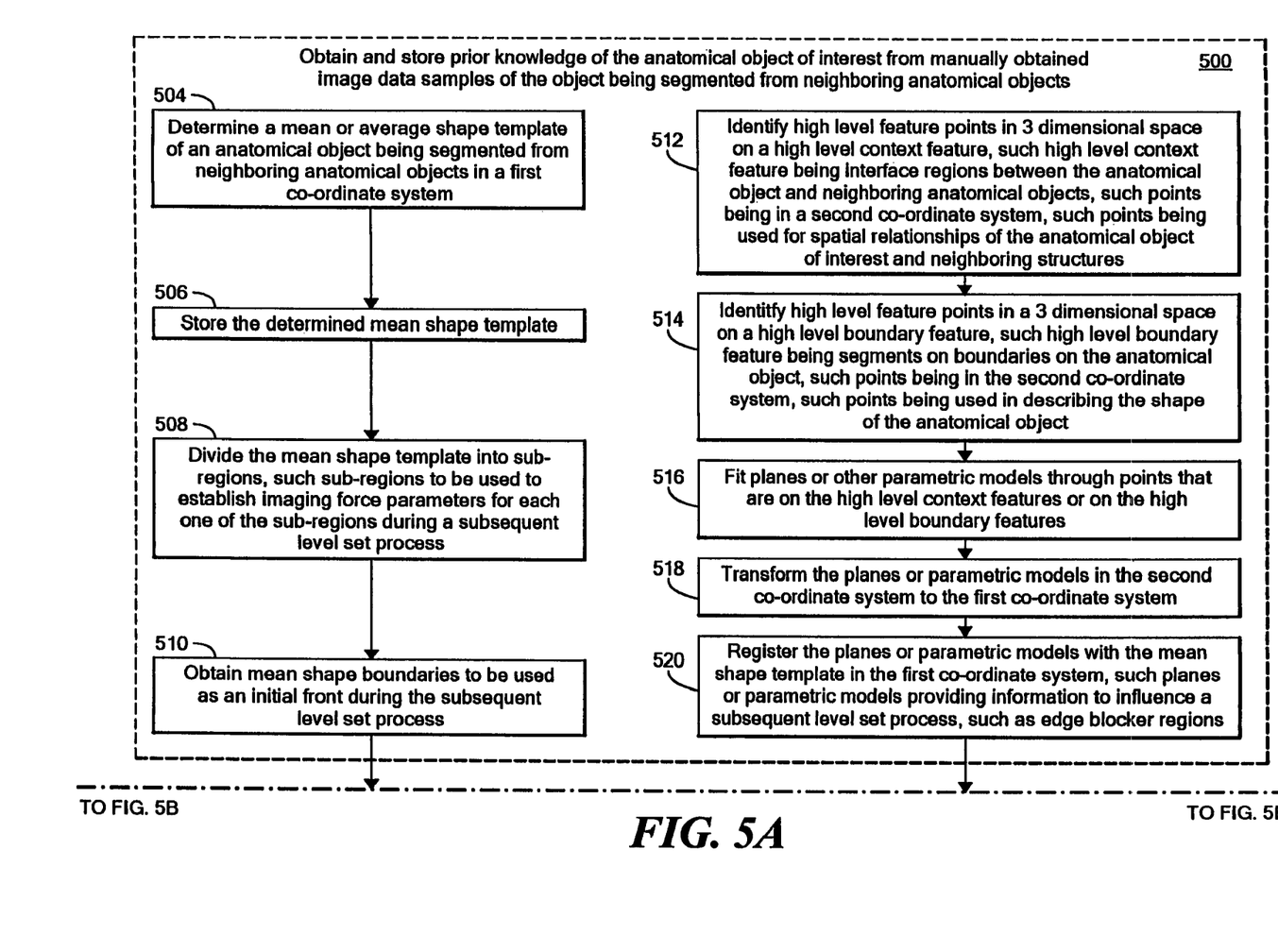
FIG. 5A shows obtain and store prior knowledge of the anatomical object of interest from manually obtained image data samples of the object being segmented from neighboring anatomical objects.
Figure 5B:
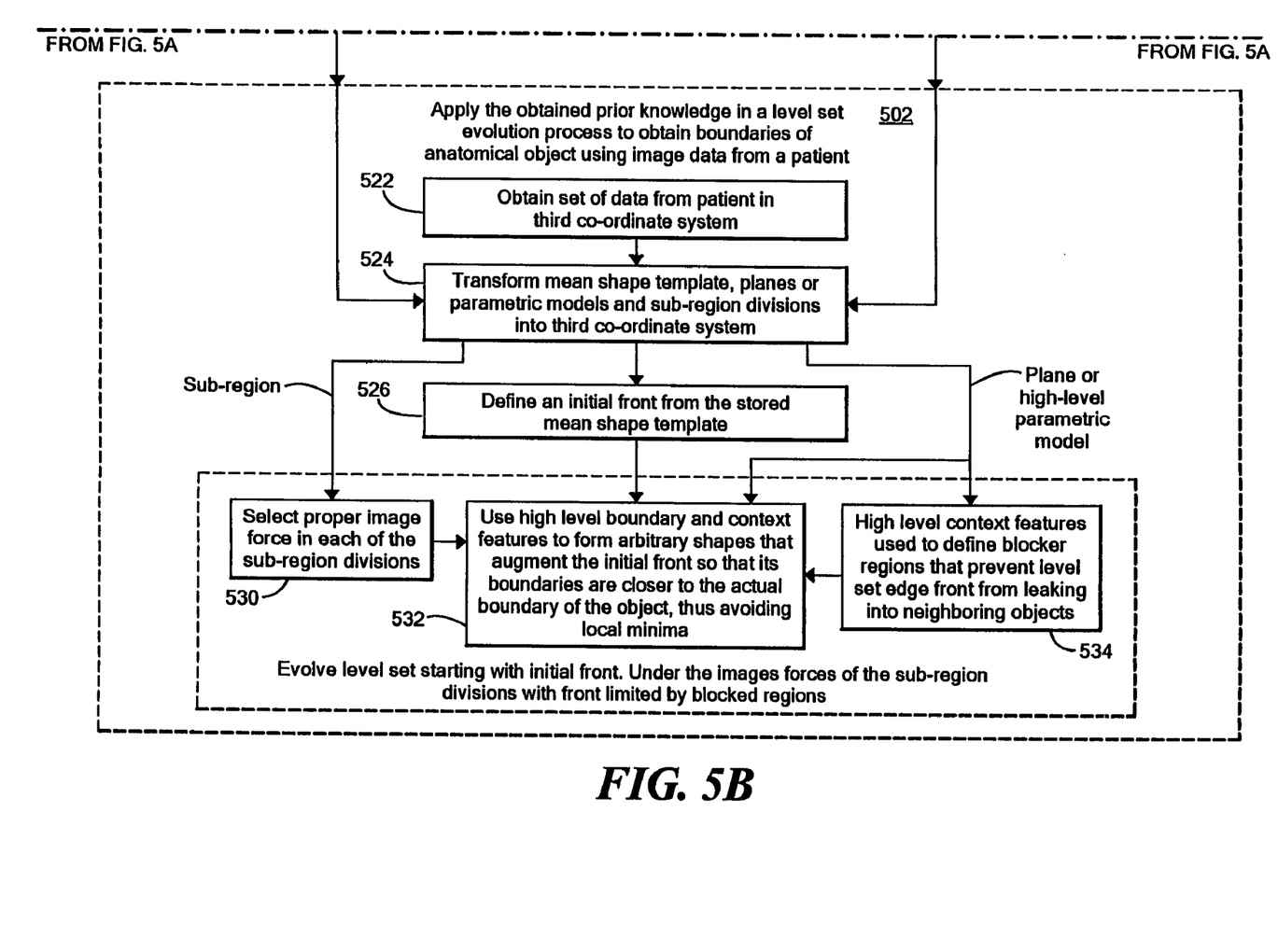
FIG. 5B shows apply the obtained prior knowledge in a level set evolution process.

From the above, the process is summarized in the flow diagram shown in FIG. 5. The process includes two major steps, i.e., obtain and store prior knowledge of the anatomical object of interest from manually obtained image data samples of the object being segmented from neighboring anatomical objects, Step 500, and applying the obtained prior knowledge in a level set evolution process to obtain boundaries of anatomical object using image data from a patient, Step 502.

In Step 500, the process: determines a mean or average shape template of an the anatomical object being segmented from neighboring anatomical objects in a first co-ordinate system, Step 504, stores the determined mean shape template; divides the mean shape template into sub-regions, such sub-regions to be used to establish imaging force parameters for each one of the sub-regions during a subsequent level set process, Step 508; and for each one of the sub-regions, obtains mean shape boundaries to be used as an initial front for each one of such sub-regions during the subsequent level set process, Step 510.

In Step 500, the process also identifies high level feature points in 3 dimensional space on a high level context feature, such high level context feature being interface regions between the anatomical object and neighboring anatomical objects such points being in a second co-ordinate system, such points being used for spatial relationships of the anatomical object of interest and the neighboring regions, as described above in connection with in FIG. 4, Step 512; identifies high level feature points in 3 dimensional space on a high level boundary feature such high level boundary feature being segments on boundaries on the anatomical object, such points being in the second co-ordinate system, such points being used in describing the shape of the anatomical object as described above in connection with FIG. 3A, Step 514; fits planes or other parametric models, such as parabolas through points that are on the high level context features or on the high level boundary features, Step 516; transforms the planes or parametric models in the second co-ordinate system to the first co-ordinate system, Step 518; and register the planes or parametric models with the mean shape template in the first co-ordinate system, such planes or parametric models providing information to influence a subsequent level set process, such as edge blocking regions, Step 520.

The process of applying the obtained prior knowledge in a level set evolution process to obtain boundaries of anatomical object using image data from a patient, i.e., Step 502 includes: obtaining a set of data from patient in third co-ordinate system, Step 522; transforming the mean shape template, planes or parametric models and sub-region divisions into third co-ordinate system, Step 524; defining an initial front from the stored mean shape template; Step 526; and evolving the level set process starting with the initial front, and under the image forces of the sub-region division, progressing to the boundary of the object while being limited by the blocked regions, Step 528, More particularly, Step includes: selecting proper image force in each of the sub-region divisions, Step 530; using high level boundary and context features to form arbitrary shapes as described above in connection with FIG. 3B, that augment the initial front so that it is closer to the actual boundaries of the object, thus avoiding local minima. Step 532; using high-level context features to define blocker regions that prevent level set edge front from leaking into neighboring objects.

Thus, from the above, prior knowledge is generated. More particularly, a mean shape of an anatomical object being segmented from neighboring anatomical objects is determined in a first co ordinate system and then stored. Also, points in three-dimensional space identify higher-level features, such as three-dimensional space of regions between the anatomical object being segmented and its neighboring objects. These points are in a second first co ordinate system. Next, using such points, the process fits planes or other parametric models through sets of adjacent ones of the points. The planes are transformed into the first coordinate system. Next, the process registers the planes with the mean shape template, as shown in FIGS. 2B and 2B, for example.

This prior knowledge is used for a subsequent level set process. More particularly, from actual patient imaging data, the process obtains a set of patent image data in a third co ordinate system. The mean shape template and the planes are transformed into this third co ordinate system. For each one of the mapped planes, the process search in the local neighborhood of the data to detect the actual high level feature. The detected high level features will be used to form arbitrary shapes to augment the initial front. Moreover, the detected high level context features are used to form blocker regions to prevent the front from evolving into them. The sub-regions will be used to set up varied convergence speeds that controls the local level set evolution.

A number of embodiments of the invention have been described. Nevertheless, it will be understood that various modifications may be made without departing from the spirit and scope of the invention. Accordingly, other embodiments are within the scope of the following claims.

What is claimed is:

1. A method for providing a image of an anatomical object and for providing segmentation of the object from neighboring objects in an image obtained from data obtained from medical imaging equipment, comprising:

using medical imaging apparatus to perform the steps of:
obtaining the data, such data including imaging data of the object and data from the neighboring objects;
generation of prior knowledge of the anatomical object to be segmented in an image from neighboring objects in the image using the obtained data;
wherein the prior knowledge includes: obtaining an average shape template of the anatomical object and identifying high level context features of the object, such high level context features including at least one of either identifiable interface regions between the object and neighboring objects or boundary sections on the object;

wherein an initial front from the template is used to initiate a level set evolution process to segment the object from neighboring objects; and wherein the method includes using the high-level context features to define blocker regions to prevent front in the level set evolution process from leaking into neighboring objects.

2. The method recited in claim 1 including subsequently using of said prior knowledge to level set evolution.

3. The method recited in claim 1 including dividing the template into a plurality of regions and wherein the level set evolution includes using a different image force for each one of the regions.

4. The method recited in claim 3 including selecting proper image force in each of the sub-region divisions.

5. A method for providing a image of an anatomical object and for providing segmentation of the object from neighboring objects in an image obtained from data obtained from medical imaging equipment, comprising:

using medical imaging apparatus to perform the steps of:
   obtaining the data, such data including imaging data of the object and the neighboring objects;
   generation of prior knowledge of the anatomical object to be segmented in an image from neighboring objects in the image using the obtained data; and
   subsequently using of said prior knowledge to initiate a level set evolution process wherein the prior knowledge includes identifying high level features of the object, such high level features including identifiable boundary regions between the object and neighboring objects;

wherein the prior knowledge includes:
   an average shape template of the anatomical object; and wherein the method includes defining an initial front from the template to initiate the level set evolution process to segment the object from neighboring objects;

wherein an initial front from the template is used to initiate a level set evolution process to segment the object from neighboring objects; an wherein the method includes using the high-level context features to define blocker regions to prevent front in the level set evolution process form leaking into neighboring objects.

6. The method recited in claim 5 wherein the prior knowledge includes identifying high level features of the object, such high level features including identifiable boundary regions between the object and neighboring objects.

7. The method recited in claim 6 wherein such high level features also includes identifiable boundary sections of the object surface.

8. The method recited in claim 7 including fitting parametric models through points on the high level context features or on the high level boundary features.

9. The method recited in claim 8 including using high level boundary and context features to form arbitrary shapes to augment the initial front so that such front is closer to the actual boundaries of the object.

10. The method recited in claim 9 including using the high-level context features to define blocker regions to prevent level set edge front from leaking into neighboring objects.

11. The method recited in claim 3 wherein the prior knowledge generation includes obtaining an average shape template of the anatomical object.

12. The method recited in claim 11 including dividing the template into a plurality of regions and wherein the level set evolution includes using a different image force for each one of the regions.

13. The method recited in claim 12 including selecting proper image force in each of the sub-region divisions.

14. A method for providing a image of an anatomical object and for providing segmentation of the object from neighboring objects in an image obtained from data obtained from medical imaging equipment, comprising:

using medical imaging apparatus to perform the steps of:
   obtaining the data, such data including imaging data of the object and data from the neighboring objects;
   generation of prior knowledge of the anatomical object to be segmented in an image from neighboring objects in the image using the obtained data;
   wherein the prior knowledge includes: obtaining an average shape template of the anatomical object and identifying features of the object, such features including at least one of either identifiable interface regions between the object and neighboring objects or boundary sections on the object;

wherein an initial front from the template is used to initiate a level set evolution process to segment the object from neighboring objects; and wherein the method includes using the features to define blocker regions to prevent front in the level set evolution process from leaking into neighboring objects.

15. The method recited in claim 14 including using the features to define blocker regions to prevent level set edge front from leaking into neighboring objects.

16. A method for providing a image of an anatomical object and for providing segmentation of the object from neighboring objects in an image obtained from data obtained from medical imaging equipment, comprising:

using medical imaging apparatus to perform the steps of:
   obtaining the data, such data including imaging data of the object and the neighboring objects;
   generation of prior knowledge of the anatomical object to be segmented in an image from neighboring objects in the image using the obtained data; and
   subsequently using of said prior knowledge to initiate a level set evolution process wherein the prior knowledge includes identifying features of the object, such features including identifiable boundary regions between the object and neighboring objects;

wherein the prior knowledge includes:
   an average shape template of the anatomical object; and wherein the method includes defining an initial front from the template to initiate the level set evolution process to segment the object from neighboring objects;

wherein an initial front from the template is used to initiate a level set evolution process to segment the object from neighboring objects; and wherein the method includes using the high-level context features to define blocker regions to prevent front in the level set evolution process from leaking into neighboring objects.

17. The method recited in claim 16 including using the features to define blocker regions to prevent level set edge front from leaking into neighboring objects.

* * * * *